(12) United States Patent
Noma et al.

(10) Patent No.: US 7,516,017 B2
(45) Date of Patent: Apr. 7, 2009

(54) BIOLOGICAL PARAMETER OUTPUT APPARATUS AND PROGRAM

(75) Inventors: Akinori Noma, Kyoto (JP); Nobuaki Sarai, Kyoto (JP); Hiroyuki Kawano, Kyoto (JP); Shohei Hido, Kyoto (JP)

(73) Assignee: Kyoto University, Kyoto (JP)

( * ) Notice: Subject to any disclaimer, the term of this patent is extended or adjusted under 35 U.S.C. 154(b) by 0 days.

(21) Appl. No.: 11/660,746

(22) PCT Filed: Aug. 22, 2005

(86) PCT No.: PCT/JP2005/015209

§ 371 (c)(1),
(2), (4) Date: Feb. 22, 2007

(87) PCT Pub. No.: WO2006/022226

PCT Pub. Date: Mar. 2, 2006

(65) Prior Publication Data

US 2007/0255504 A1    Nov. 1, 2007

(30) Foreign Application Priority Data

Aug. 26, 2004   (JP) ............................. 2004-246134

(51) Int. Cl.
*G01N 33/48* (2006.01)
*G06F 19/00* (2006.01)

(52) U.S. Cl. ........................................ 702/19; 600/512
(58) Field of Classification Search .................... 702/19, 702/21, 70–71, 189; 600/300, 481, 512, 600/547; 435/287.1; 128/734, 735
See application file for complete search history.

(56) References Cited

U.S. PATENT DOCUMENTS 5,634,469 A * 6/1997 Bruder et al. ............... 600/512

7,266,457 B1 * 9/2007 Hickman ..................... 702/19
2006/0074321 A1 * 4/2006 Kouchi et al. ............... 600/481

FOREIGN PATENT DOCUMENTS

JP   61-119252 A   6/1986

(Continued)

OTHER PUBLICATIONS

Nobuaki Sarai et al., "simBio: a platform for developing a dynamic model in biology", the Journal of Japan Society of Medical Electronics and Biological Engineering, BME, vol. 18, No. 2, pp. 3-11 (Feb. 2004).
International Search Report.

*Primary Examiner*—John H Le
(74) *Attorney, Agent, or Firm*—Rader, Fishman & Grauer, PLLC

(57) ABSTRACT

It is an object of the invention to measure the change in action potential waveforms during administration of a drug by testing in cultured cells or in animals, and using this measurement to evaluate the influence of administration of the drug on biological parameters, thereby providing an approach to evaluating the effect on individual channels of a cell. The invention provides a biological parameter output apparatus that contains at least one piece of waveform information that includes at least one piece of biological parameter information, which is a set of a biological parameter identifier and a biological parameter value, and action potential waveform information, receives input of action potential waveform information, acquires at least one piece of biological parameter information based on the action potential waveform information, and outputs the at least one biological parameter information acquired. With this biological parameter output apparatus, it is possible to evaluate the effect on individual channels of a cell.

6 Claims, 10 Drawing Sheets

FOREIGN PATENT DOCUMENTS

| | | |
|---|---|---|
| JP | 03-015439 A | 1/1991 |
| JP | 08-016551 A | 1/1996 |
| JP | 08-280644 A | 10/1996 |
| JP | 08-289877 A | 11/1996 |
| JP | 10-323335 A | 12/1998 |
| JP | 2000-163397 A | 6/2000 |
| JP | 2002-537008 A | 11/2002 |
| JP | 2004-508073 A | 3/2004 |

\* cited by examiner

FIG.5A

| ID | IKr | IK1 | APD30 | APD60 | APD90 |
|----|-----|-----|-------|-------|-------|
| 1 | 0.0 | 0.2 | 93 | 161 | 111 |
| 2 | 0.0 | 0.4 | 133 | 240 | 269 |
| 3 | 0.0 | 0.6 | 116 | 183 | 202 |
| ⋮ | ⋮ | ⋮ | ⋮ | ⋮ | ⋮ |

FIG.5B

| ID | IKs | IK1 | APD30 | APD60 | APD90 |
|---|---|---|---|---|---|
| 1 | 0.0 | 0.2 | 29 | 78 | 185 |
| 2 | 0.0 | 0.40 | 125 | 227 | 249 |
| 3 | 0.0 | 0.6 | 160 | 237 | 254 |
| ⋮ | ⋮ | ⋮ | ⋮ | ⋮ | ⋮ |

FIG.5C

| ID | IKs | IKr | APD30 | APD60 | APD90 |
|----|-----|-----|-------|-------|-------|
| 1 | 0.0 | 0.0 | 138 | 192 | 203 |
| 2 | 0.0 | 0.50 | 135 | 186 | 196 |
| 3 | 0.0 | 0.1 | 133 | 180 | 190 |
| ⋮ | ⋮ | ⋮ | ⋮ | ⋮ | ⋮ |

FIG.7

| ID | IKr | IK1 | IKs | sum of difference | degree of approximation |
|---|---|---|---|---|---|
| 1 | 0.0 | 0.2 | 1 | 69 | 1/69 |
| 2 | 0.0 | 0.4 | 1 | 322 | 1/322 |
| ⋮ | ⋮ | ⋮ | ⋮ | ⋮ | ⋮ |
| n | 3.2 | 1.62 | 4.27 | 3 | 1/3 |
| ⋮ | ⋮ | ⋮ | ⋮ | ⋮ | ⋮ |

US 7,516,017 B2

BIOLOGICAL PARAMETER OUTPUT APPARATUS AND PROGRAM

BACKGROUND OF THE INVENTION

1. Field of the Invention

The present invention relates to a biological parameter output apparatus and the like that estimates a biological parameter on which the effect and the like of administration of a drug and the like are exerted, by supplying, as input, the change in the action potential waveform of a cell membrane, using an action potential simulation.

2. Description of the Related Art

At present, it is necessary to carry out various evaluations, including for example, the evaluation of prolongation of the QT interval in the electrocardiogram, as the testing of new drugs. Pharmaceutical companies and the like perform testing such as testing in cultured cells, testing in animals and testing on humans to test the changes exerted by these new drugs on various parameters of biological bodies and to check the effect, safety and the like.

Further, a simulation method and apparatus for diffusion of drugs in living tissues are available that enable accurate analysis of the diffusion phenomena of drugs in living tissues (see Patent Document 1). Such a simulation method is a method for simulating in-vivo diffusion of a specific substance using the finite element method, including: determining a reference diffusion property constant in a biological body using a portion of tissues separated from the biological body, without using the finite element method; setting a reference diffusion property based on the reference diffusion property constant; determining a living structure that is to be analyzed, based on the finite element method; computing diffusion in the living structure determined using the reference diffusion property constant, based on the finite element method; comparing a computed diffusion property according to a computation result of diffusion in the biological body based on the finite element method with the reference diffusion property determined without using the finite element method, and correcting the reference diffusion property constant such that a deviation between the computed diffusion property and the reference diffusion property is the minimum, thereby calculating an optimum diffusion property coefficient based on finite element method.

In addition, an arteriosclerosis degree measurement method is available that involves storing reference information of a plurality of arterial pressure waveforms respectively corresponding to stages of arteriosclerosis is stored, comparing them with arterial pressure waveform information obtained from an artery of a biological body, and outputting the age of a similar waveform (see Patent Document 2, and Patent Document 3).

Furthermore, as a related technique, a simulation apparatus is available that receives a biological parameter set as input, simulates a cell, and acquires action potential waveform information (see Non-Patent Document 1).

Patent Document 1  JP H08-016551A (e.g., page 1 and FIG. 1)
Patent Document 2  JP S61-119252A (e.g., page 1 and FIG. 1)
Patent Document 3  JP H03-015439A (e.g., page 1 and FIG. 1)

Non-patent Document 1 Nobuaki Sarai, Akinori Noma, "simBio: platform for biological dynamic model", the journal of Japan Society of Medical Electronics and Biological Engineering, BME, vol. 18, No. 2, p. 3-11, 2004 (issued in February 2004).

SUMMARY OF THE INVENTION

However, the above-described testing involves a huge number of evaluation tests, requiring an enormous amount of time and cost.

Moreover, the simulation method according to Patent Document 1 is a method of analysing a diffusion phenomenon of drugs in living tissues, but not a method of estimating biological parameters representing the effect and the like of administration of a drug and the like.

Furthermore, the techniques according to Patent Documents 2 and 3 are techniques for measuring the degree of arteriosclerosis, and cannot perform, for example, evaluation of the influence exerted on biological parameters by administered drugs. Moreover, the age determining unit according to Patent Documents 2 and 3 requires storing in advance a plurality of reference patterns corresponding respectively to the ages involved.

If the contribution of a target drug to various channel functions and the estimation of changes in the electrocardiogram could be simulated on a calculator based on data in an earlier stage in these huge number of evaluation tests and the effect thereof on humans could be estimated, then it would be possible to shorten the drug development process. Therefore, it is an object of the present invention to provide an approach to measuring a change in an action potential waveform when administering a drug, for example, by testing in cultured cell or animals, using this to evaluate the effect of the administered drug on individual channels of the cell, and evaluating the influence exerted by the administered drug on a biological parameter.

BRIEF DESCRIPTION OF THE DRAWINGS

FIG. 5A shows a reconstructed action potential waveform information management table.
FIG. 5B shows a reconstructed action potential waveform information management table.
FIG. 5C shows a reconstructed action potential waveform information management table.
FIG. 7 shows an approximation degree management table.

DETAILED DESCRIPTION OF THE INVENTION

Figure 1:
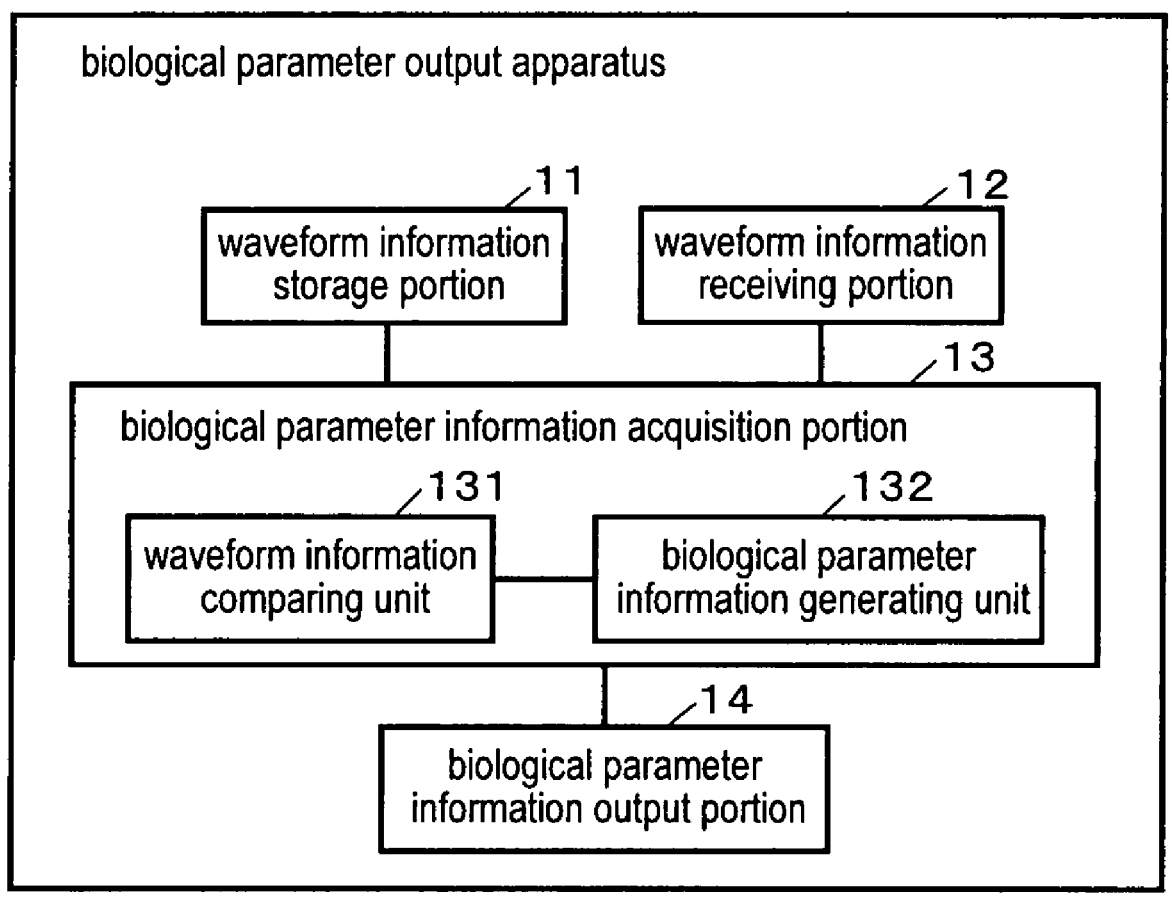
FIG. 1 is a block diagram showing a biological parameter output apparatus.

A first aspect of the present invention is directed to a biological parameter output apparatus, including: a waveform information storage portion that contains at least one piece of waveform information that includes a biological parameter set including at least one piece of biological parameter information, which is a set of a biological parameter identifier for identifying a biological parameter and a biological parameter value, which is a value of the biological parameter identified by the biological parameter identifier, and action potential waveform information, which is information representing an action potential waveform that corresponds to that biological parameter set; a waveform information receiving portion that receives input of action potential waveform information; a biological parameter information acquisition portion that identifies and acquires a biological parameter set including at least one piece of biological parameter information that can reproduce waveform information that is most approximate to the action potential waveform information received by the waveform information receiving portion; and a biological parameter information output portion that outputs the biological parameter set acquired by the biological parameter information acquisition portion.

A second aspect of the present invention is directed to the biological parameter output apparatus according to the first aspect, wherein the biological parameter set included in the waveform information stored in the waveform information storage portion is information that has been input, and the action potential waveform information included in the waveform information stored in the waveform information storage portion is information that has been acquired using a biological simulation for the input biological parameter set.

Furthermore, a third aspect of the present invention is directed to the biological parameter output apparatus according to the first or the second aspect, wherein the action potential waveform information is information that characterizes the action potential waveform of APD30, APD60 and APD90, and the biological parameter information acquisition portion acquires the action potential waveform information of APD30, APD60 and APD90, and acquires a biological parameter set including at least one piece of biological parameter information that matches or is most approximate to the acquired three pieces of action potential waveform information.

With this configuration, it is possible to acquire a biological parameter set at high speed with a small amount of CPU power.

Furthermore, a fourth aspect of the invention is directed to the configuration according to the above-described first or the second aspect, wherein a biological parameter set that can reproduce waveform information that is most approximate to the action potential waveform information before and after administration of a drug can be acquired using a biological simulation and the effect of administration of the drug can be output as a biological parameter.

EFFECT OF THE INVENTION

The present invention can provide an apparatus and the like that output a biological parameter representing the effect and the like of administration of a drug, for example.

BEST MODE FOR CARRYING OUT THE INVENTION

In this embodiment, a description is given of an apparatus and the like that output a biological parameter in order to represent, for example, the effect of administration of medication and to determine the present health conditions and the like of a biological body. It should be noted that the biological parameters include several hundreds of parameters, including for example, currents flowing through various cell channels (for example, Na channels, Ca channels, $K_{ATP}$ channels, Kr channels, K1 channels, and Ks channels), the opening and closing speed of each of the channels, ion affinity, and intracellular and extracellular ion concentrations.

An embodiment of the biological parameter output apparatus and the like is described below with reference to the accompanying drawings. It should be noted that structural components that are denoted by the same reference numerals in the embodiment perform the same operation, and therefore may not be described in duplicate.

FIG. 1 is a block diagram showing the biological parameter output apparatus. The biological parameter output apparatus includes a waveform information storage portion 11, a waveform information receiving portion 12, a biological parameter information acquisition portion 13, and a biological parameter information output portion 14. The biological parameter information acquisition portion 13 includes a waveform information comparing unit 131, and a biological parameter information generating unit 132.

The waveform information storage portion 11 contains at least one piece of waveform information that includes a biological parameter set including at least one piece of biological parameter information, which is a set of a biological parameter identifier for identifying a biological parameter and a biological parameter value, which is a value of the biological parameter identified by the biological parameter identifier, and action potential waveform information, which is information representing an action potential waveform.

Here, the waveform information is ordinarily acquired by a unit, which is not shown in the drawing, in the following manner. That is, an waveform information acquiring apparatus or the like (not shown) receives, as input, a biological parameter set including at least one piece of biological parameter information, which is a set of a biological parameter identifier for identifying a biological parameter and a biological parameter value, which is a value of the biological parameter identified by the biological parameter identifier, and acquires the action potential waveform information corresponding to the biological parameter set. To this end, the action potential waveform information may be acquired using a biological body. The waveform information acquiring apparatus may also apply a biological parameter set to a cell model for simulating a cell, and acquire action potential waveform information using a simulation (hereinafter, action potential waveform information obtained using a simulation is referred to as "reconstructed action potential waveform information", where appropriate). This cell model can be replaced with a model that can best reproduce a test result. In this case, the biological parameter output apparatus may incorporate a waveform information acquiring apparatus, and generate a simulation result each time. Additionally, the biological parameter output apparatus may read pre-generated action potential waveform information from a database. Furthermore, the action potential waveform information may be in the form of a graph or a record. That is, the action potential waveform information may have any data structure. The waveform information storage portion 11 may be preferably a nonvolatile recording medium, but may also be implemented by a volatile recording medium. In addition, a storage medium that contains at least one biological parameter set and at least one piece of action potential waveform information corresponding to that biological parameter set is used as a waveform information database (not shown). It should be noted that the simulation apparatus (an example of the waveform information acquiring apparatus) that receives the biological parameter set as input, and simulates the cell to acquire the action potential waveform information is known in the art (see Non-Patent Document 1 above).

Figure 2:
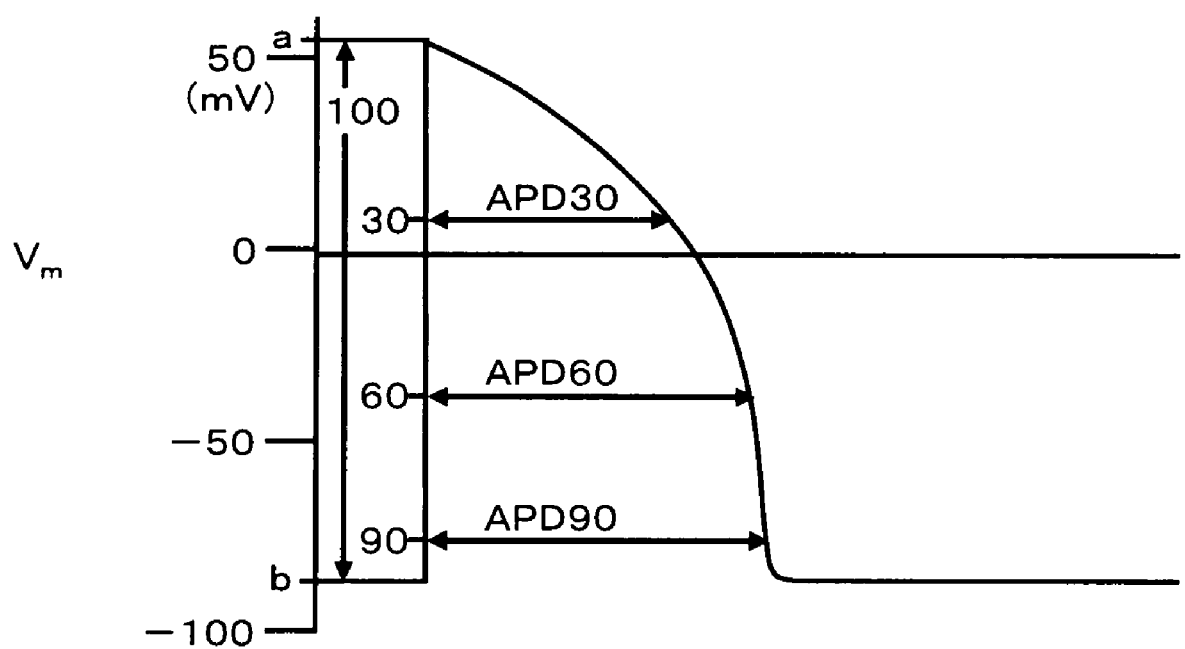
FIG. 2 is a diagram illustrating APD30, APD60 and APD90.

The waveform information receiving portion 12 receives input of action potential waveform information, which is information relating to an action potential waveform. Here, the action potential waveform information is ordinarily information measured from a biological body such as an organism, an organ, a tissue or a cell. The action potential waveform information may be, for example, information of an action potential waveform of a cell before and after administering a drug, or information of the action potential waveform obtained from a cell of a gene knockout animal or a disease model animal. The action potential waveform information may or may not be all the time series data of a membrane potential (set of information of the points constituting a waveform). That is, the action potential waveform information may be, for example, the value of APD30, the value of APD60 and the value of APD90 of a waveform. The value of APD30, the value of APD60 and the value of APD90 are the values shown in FIG. 2. That is, in FIG. 2, when the height from the maximum potential (point a) to the minimum potential (point b) of the waveform is taken as 100, the width of the waveform at the height 30 below point a is APD30. Similarly, when the height from the maximum potential (point a) to the minimum potential (point b) of the waveform is taken as 100, the width of the waveform at the heights 60 below and 90 below point a are APD60 and APD90, respectively. The action potential waveform information may be input through any unit, including for example, a scanner, a keyboard, a mouse or a menu screen. Additionally, the action potential waveform information may be information output from another apparatus, including for example, a measurement apparatus. The waveform information receiving portion 12 may be implemented, for example, with a device driver for an input unit such as a scanner or a keyboard, or control software for a menu screen.

The biological parameter information acquisition portion 13 identifies and acquires a biological parameter set including at least one piece of biological parameter information based on the action potential waveform information received by the waveform information receiving portion 12 and a portion or all of the waveform information in the waveform information storage portion 11. A specific example of the algorithm of acquiring the biological parameter information will be described later. For acquisition of the biological parameter information, it is possible to apply various parameter search algorithms, including, for example, the design of experiments method, genetic algorithms, the steepest descent method and the response surface method. The parameter can be extracted by making comparison with the results of any simulation. Ordinarily, the biological parameter information acquisition portion 13 may be implemented by an MPU, a memory or the like. The processing procedure of the biological parameter information acquisition portion 13 is ordinarily implemented with software and that software is recorded in a recording medium such as a ROM. However, the biological parameter information acquisition portion 13 may be implemented by hardware (dedicated circuit).

The biological parameter information output portion 14 outputs the biological parameter set acquired by the biological parameter information acquisition portion 13. "Output" is a concept that includes, for example, display on a display device, printing on a printer, sound output and transmission to an external apparatus. The biological parameter information output portion 14 may be considered to include, or not to include, an output device such as a display or a speaker. The output portion may be implemented, for example, with driver software for an output device, or driver software for an output device and the output device.

The waveform information comparing unit 131 judges the degree of approximation between the action potential waveform information acquired from the waveform information storage portion 11 and the action potential waveform information received by the waveform information receiving portion 12. The waveform information comparing unit 131 may also acquire and compare action potential characteristic information of APD30 and the like in the following manner, for example. That is, the action potential waveform information received by the waveform information receiving portion 12 is taken to be a set of numerical sequences of the potentials (mV) and the time (ms) constituting the waveform. In that case, the waveform information comparing unit 131 acquires two points of time, $(T_1, T_2)$ forming pairs with the value of "maximum potential−(maximum potential−minimum potential)×0.3". Next, the waveform information comparing unit 131 determines "$|T_1-T_2|$" (absolute value of a difference between $T_1$ and $T_2$) as APD30. The waveform information comparing unit 131 performs the same determination also for APD60 and APD90. Further, the action potential waveform information received by the waveform information receiving portion 12 is taken to be the values of APD30, APD60 and APD90. Then, the waveform information comparing unit 131 calculates the total of the absolute value of a difference between the determined APD30 and the APD30 received by the waveform information receiving portion 12, the absolute value of a difference between the determined APD60 and the APD60 received by the waveform information receiving portion 12, and the absolute value of a difference between the determined APD90 and the APD90 received by the waveform information receiving portion 12. The waveform information comparing unit 131 may also discretize the waveform data, for example, using the Adaptive Piecewise Constant Approximation method, may directly compare a set of numerical sequences of potentials paired with times using, for example, the sum of squares of a difference between the waveform information being compared, or may perform comparison by measuring an Euclidean distance, for example.

The biological parameter information generating unit 132 identifies a biological parameter set including at least one piece of biological parameter information, compared by the waveform information comparing unit 131, that is paired with the action potential information and has matching or the most approximate action potential waveform information. The biological parameter information generating unit 132 may also check all the waveform information that can be acquired from the waveform information storage portion 11 in a round robin fashion and extract the biological parameter set included in the matching or most approximate waveform information. For example, when the waveform information comparing unit 131 calculates the total of the absolute value of a difference between the determined APD30 and the APD30 received by the waveform information receiving portion 12, the absolute value of a difference between the determined APD60 and the APD60 received by the waveform information receiving portion 12, and the absolute value of a difference between the determined APD90 and the APD90 received by the waveform information receiving portion 12, the biological parameter information generating unit 132 acquires at least one piece of biological parameter information paired with the action potential information having the smallest total value from the waveform information storage portion 11. The biological parameter information generating unit 132 may also acquire at least one piece of biological parameter information at high speed from sorted waveform information by using an algorithm such as binary search. The biological parameter information generating unit 132 may also extract the biological parameter information by using an approach such as hybrid tree indexing, the design of experiments method, a genetic algorithm, the steepest descent method or the response surface method.

The operation of the biological parameter output apparatus according to this embodiment is described below with reference to the flowchart in FIG. 3.

(Step S301) The waveform information receiving portion 12 judges whether input of the action potential waveform information has been received. If input of the action potential waveform information has been received, then the procedure advances to Step S302. If input of the action potential waveform information has not been received, then the procedure returns to Step S301.

(Step S302) The biological parameter information generating unit 132 assigns 1 to a counter i.

(Step S303) The biological parameter information generating unit 132 generates a new biological parameter set (at least one piece of biological parameter information) and acquires the i-th reconstructed action potential waveform information from the waveform information storage portion 11. It should be noted that the biological parameter set may be generated in various manners. Additionally, as a result of a simulation in a biological simulation portion, which is not shown in the drawings, at least one piece of reconstructed action potential waveform information may be stored in the waveform information storage portion 11.

(Step S304) The waveform information comparing unit 131 judges whether the i-th reconstructed action potential waveform information is present. If it is present, then the procedure advances to Step S305. If it is not present, the procedure skips to Step S309.

(Step S305) The waveform information comparing unit 131 calculates the degree of approximation, which is the degree at which the action potential information acquired in Step S301 and the i-th reconstructed action potential waveform information are approximate. It should be noted that there are various methods of calculating the degree of approximation. A specific example of the method of calculating the degree of approximation will be described later.

(Step S306) The waveform information comparing unit 131 temporarily stores the degree of approximation calculated in Step S306 in association with the i-th reconstructed action potential waveform information.

(Step S307) The waveform information comparing unit 131 increments the counter i by 1.

(Step S308) if a pre-specified number of turns has not been reached and the degree of approximation is lower than a predetermined degree of approximation (if a certain condition is satisfied) in the waveform information comparing unit 131, then the procedure returns to Step S303. If the condition is not satisfied, then the procedure advances to Step S309. Here, "number of turns" refers to a number that covers all combinations of the biological parameter sets.

(Step S309) The biological parameter information generating unit 132 acquires the biological parameter set (at least one piece of biological parameter information) having the highest degree of approximation.

(Step S310) The biological parameter information output portion 14 outputs the at least one piece of biological parameter information acquired in Step S309. The procedure returns to Step S301.

Figure 3:
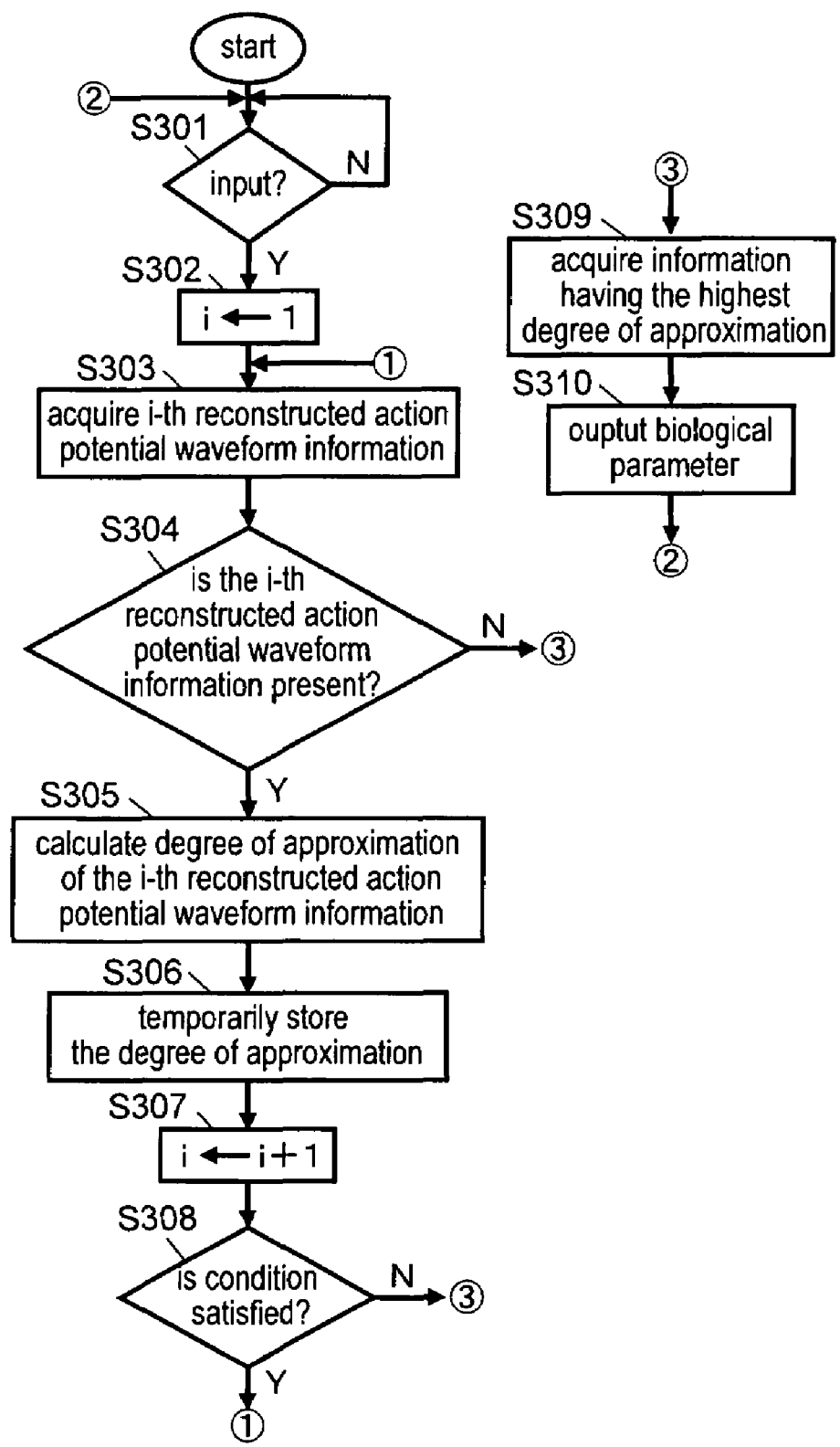
FIG. 3 is a flowchart illustrating the operation of the biological parameter output apparatus.

In addition, in the flowchart in FIG. 3, the process is completed by turning the power off, or by an interrupt indicating the end of the process.

A specific operation of the biological parameter output apparatus according to this embodiment is described below.

Figure 4:
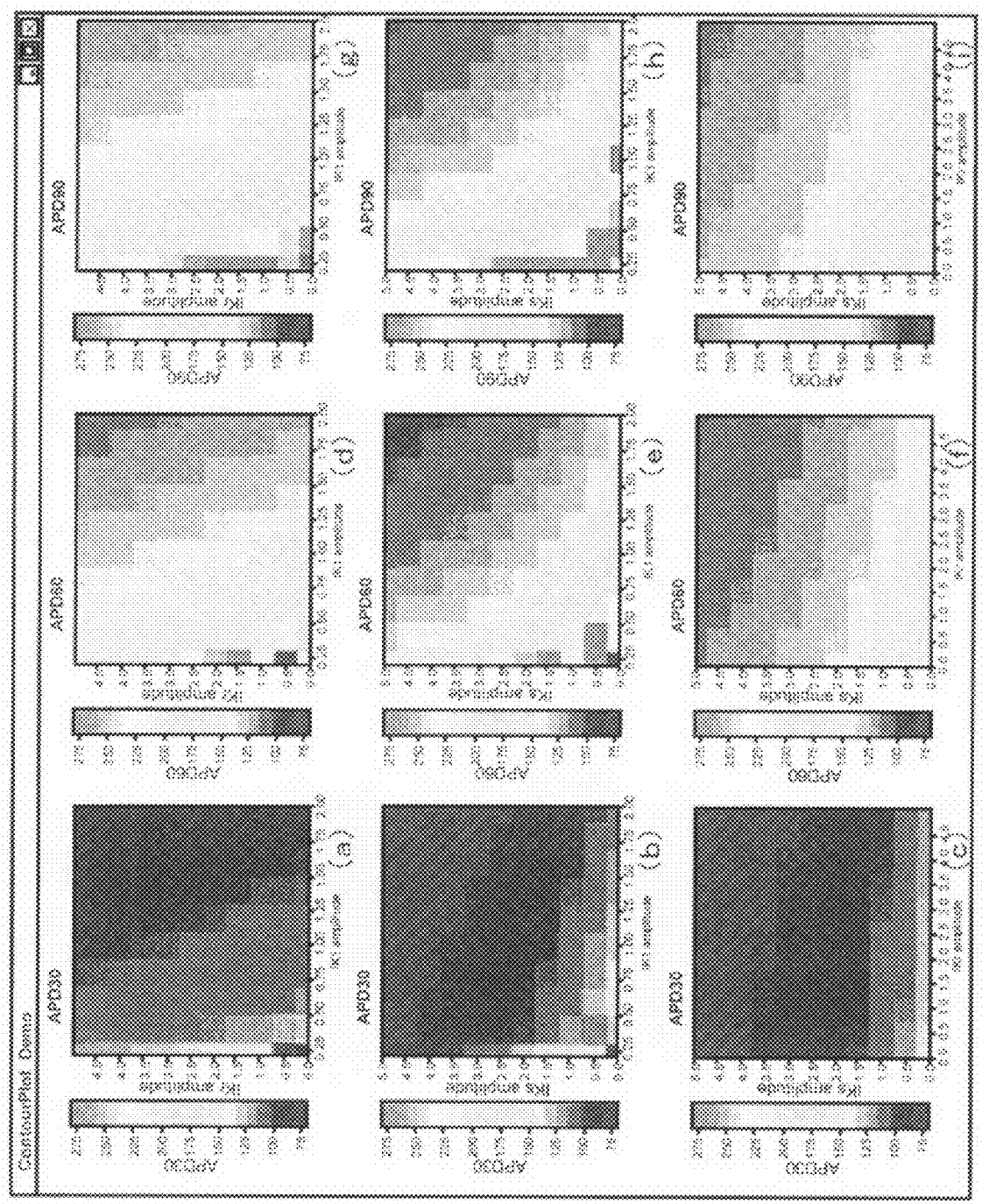
FIG. 4 shows examples of the reconstructed action potential waveform information.

Now, the waveform information storage portion 11 holds the reconstructed action potential waveform information shown in FIG. 4. This reconstructed action potential waveform information is information representing the biological parameters identified by the three biological parameter identifiers "IKr", "IK1" and "IKs", and the relationship between the value of each biological parameter and the action potential information. FIG. 4(a) is a graph showing the value of APD30 when the value of the biological parameter identifier "IKr" is plotted from "0" to "5.0" and the value of "IK1" is plotted from "0.2" to "2.00". Here, each biological parameter is a numeric value where 1 represents a normal state. Ordinarily, this reconstructed action potential waveform information is action potential waveform information acquired using a biological simulation, and the action potential information stored in the waveform information storage position 11. Information that is actually measured from a biomaterial may be used in place of the biological simulation.

The value of "IKr" is plotted on the horizontal axis, and the value of "IK1" is plotted on the vertical axis. The color of the rectangle at the intersection point represents the value of APD30. Since FIG. 4 is monochrome, the depth of the color of the rectangle generally represents the value of APD30. The meanings of the horizontal axis, the vertical axis and the depth of the color of the rectangle are the same in the rest of the graphs in FIG. 4.

FIG. 4(b) is a graph showing the value of APD30 when the value of the biological parameter identifier "IKs" is plotted from "0" to "5.0" and the value of "IK1" is plotted from "0.2" to "2.00".

FIG. 4(c) is a graph showing the value of APD30 when the value of the biological parameter identifier "IKs" is plotted from "0" to "5.0" and the value of "IKr" is plotted from "0" to "5.0".

FIG. 4(d) is a graph showing the value of APD60 when the value of the biological parameter identifier "IKr" is plotted from "0" to "5.0" and the value of "IK1" is plotted from "0.2" to "2.00".

FIG. 4(e) is a graph showing the value of APD60 when the value of the biological parameter identifier "IKs" is plotted from "0" to "5.0" and the value of "IK1" is plotted from "0.2" to "2.00".

FIG. 4(f) is a graph showing the value of APD60 when the value of the biological parameter identifier "IKs" is plotted from "0" to "5.0" and the value of "IKr" is plotted from "0" to "5.0".

FIG. 4(g) is a graph showing the value of APD90 when the value of the biological parameter identifier "IKr" is plotted from "0" to "5.0" and the value of "IK1" is plotted from "0.2" to "2.00".

FIG. 4(h) is a graph showing the value of APD90 when the value of the biological parameter identifier "IKs" is plotted from "0" to "5.0" and the value of "IK1" is plotted from "0.2" to "2.00".

FIG. 4(i) is a graph showing the value of APD90 when the value of the biological parameter identifier "IKs" is plotted from "0" to "5.0" and the value of "IKr" is plotted from "0" to "5.0".

It should be noted that FIG. 4 may be acquired from a reconstructed action potential waveform information management table as shown in FIG. 5, for example. Here, FIG. 5A shows a table that holds a plurality of records including "ID", "IKs", "IK1", "APD30", "APD60" and "APD90". "ID" is information for identifying the records, and is present for managing the records in the table. "IKs" is the value of the biological parameter identifier "IKs", "IK1" is the value of the biological parameter identifier "IK1". "APD30", "APD60" and "APD90" are the values of "APD30", "APD60" and "APD90", respectively, when the value of "IKs" and the value of "IK1" are specified. FIG. 5B shows a table showing the relationship between the values of the biological parameter identifiers "IKs" and "IK1" with "APD30", "APD60" and "APD90". FIG. 5C shows a table showing the relationship between the values of the biological parameter identifiers "IKs" and "IKr" with "APD30", "APD60" and "APD90".

FIG. 4 can also be called a view that is shown by acquiring the information in FIG. 5.

It should be noted that acquisition of the values of APD30, APD60 and APD90 from a waveform is possible by a known technique.

Figure 6:
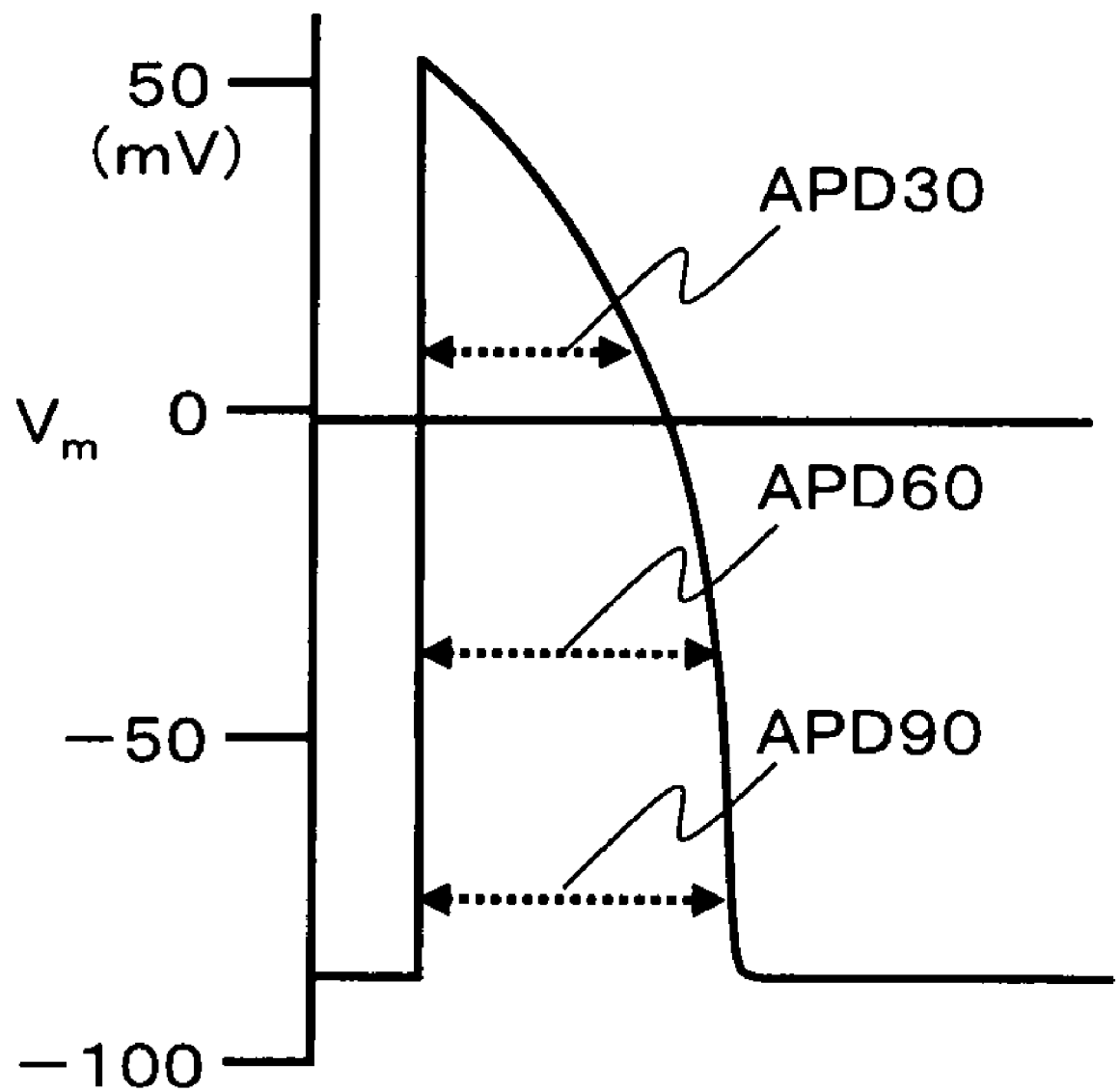
FIG. 6 shows action potential waveform information that was input.

Let us assume that the action potential waveform information shown in FIG. 6 has been input in such a situation. Then, the waveform information receiving portion 12 receives input of the action potential waveform information shown in FIG. 6. Next, the waveform information comparing unit 131 acquires action potential information representing the action potentials of APD30, APD60 and APD90 of the action potential waveform information received by the waveform information receiving portion 12. Here, let us assume that the waveform information comparing unit 131 has acquired 78 as APD30, 119 as APD60 and 123 as APD90.

Next, the waveform information comparing unit 131 successively determines the degree of approximation between all the reconstructed action potential waveform information and the acquired "APD30:78", "APD60:119" and "APD90:123", starting from the first reconstructed action potential waveform information. Here, the degree of approximation is taken as the reciprocal of the sum of the absolute values of a difference between the value of the APD of the reconstructed action potential waveform information and the acquired value of APD. A specific method of calculating the degree of approximation is described below.

First, the waveform information comparing unit 131 acquires the reconstructed action potential waveform information for the first reconstructed action potential waveform information "IKr=0", "IK1=0.2" and "IKs=1". Specifically, from FIG. 5A, the reconstructed action potential waveform information is "APD30=93", "APD60=161" and "APD90=111".

Next, the waveform information comparing unit 131 calculates the absolute value of a difference between the value "78" of APD30 of the reconstructed action potential waveform information and the value of APD30, that is, "|78−93|" to obtain "15". Next, the waveform information comparing unit 131 calculates the absolute value of a difference between the value "119" of APD60 of the reconstructed action potential waveform information and the value of APD60. Specifically, the waveform information comparing unit 131 obtains "|119−161|=42". Next, the waveform information comparing unit 131 calculates the absolute value of a difference between the value "123" of APD90 of the reconstructed action potential waveform information and the value of APD90. Specifically, the waveform information comparing unit 131 obtains "|123−111|=12". Next, the waveform information comparing unit 131 determines the sum of the difference of APD30, the difference of APD60 and the difference of APD90. That is, the waveform information comparing unit 131 obtains "15+42+12=69". Next, the waveform information comparing unit 131 obtains the degree of approximation "1/69", which is the reciprocal of the sum. Then, the waveform information comparing unit 131 temporarily stores a record including the values of the biological parameters, the sum of the difference "69" and the degree of approximation "1/69" and forms an approximation degree management table. FIG. 7 shows such an approximation degree management table. In FIG. 7, the approximation degree management table holds at least one record including "ID", "IKr", "IK1", "IKs", "the sum of the difference" and "degree of approximation". "ID" is information for identifying the record, and is present for managing the record in the table. "IKr", "IK1" and "IKs" are the respective values of the biological parameters. "The sum of the difference" and "degree of approximation" are values obtained as described above.

Similarly, the waveform information comparing unit 131 acquires the reconstructed action potential waveform information for the second reconstructed action potential waveform information "IKr=0.0", "IK1=0.4" and "IKs=1". Specifically, from FIG. 5A, the reconstructed action potential waveform information is "APD30=133", "APD60=240" and "APD90=269". Then, let us assume that the waveform information comparing unit 131 has calculated, for example the sum of the difference "322" and the degree of approximation "1/322".

Here, the waveform information comparing unit 131 then determines the degree of approximation for all the combinations of the values of "IKr", "IK1" and "IKs" in a round robin fashion.

After determining the degree of approximation for all the combinations of the values of "IKr", "IK1" and "IKs", the biological parameter information generating unit 132 acquires the record having the highest degree of approximation. Here, the record having the highest degree of approximation is taken as the record "ID=n". Then, the biological parameter information generating unit 132 acquires the values of "IKr", "IK1" and "IKs" included in the record "ID=n".

Figure 8:
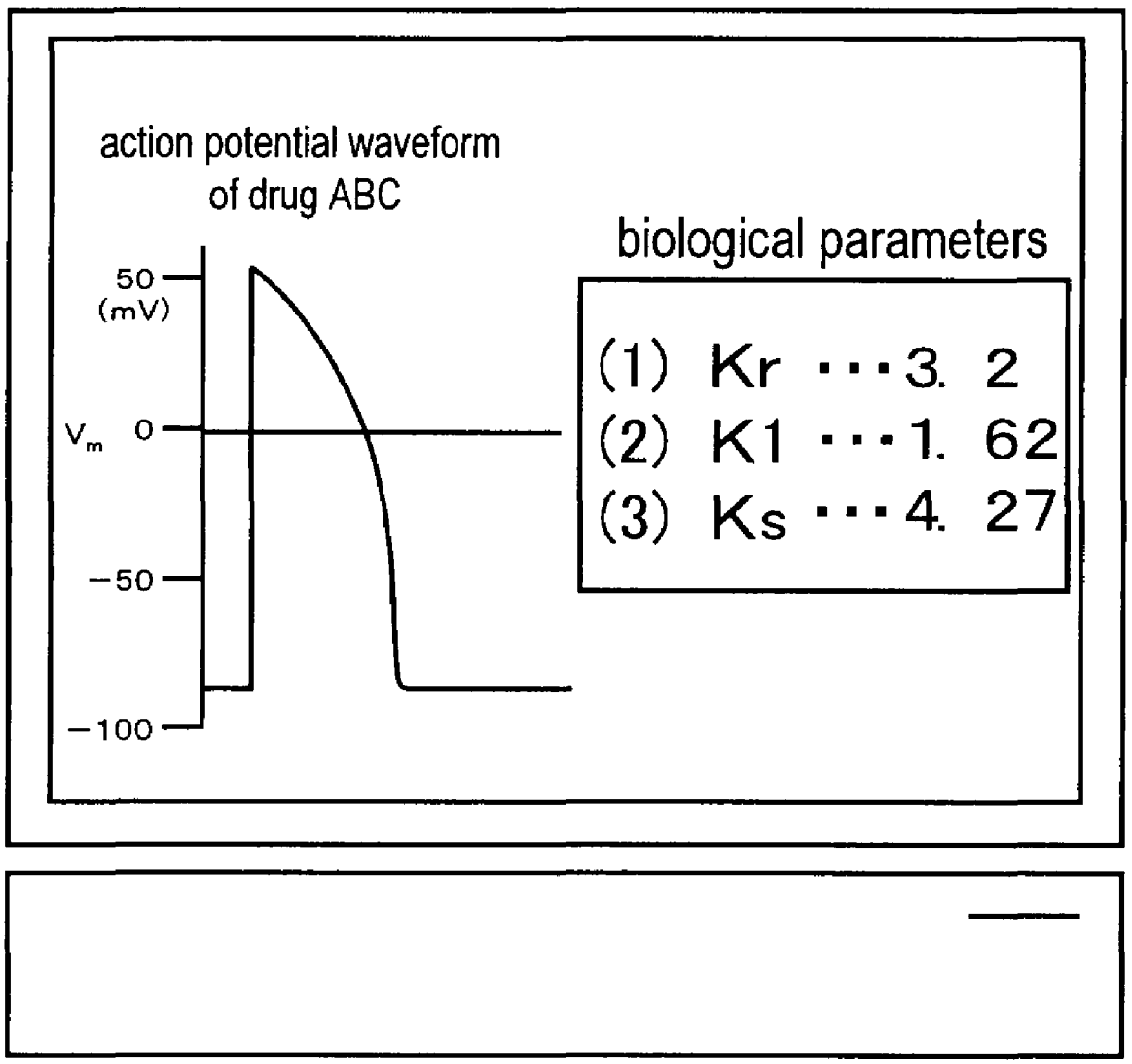
FIG. 8 shows an example of output of biological parameters.

Next, the biological parameter information output portion 14 outputs the values of "IKr", "IK1" and "IKs". An example of such output is shown in FIG. 8.

By subsequently inputting the action potential waveform information acquired after administering a drug "ABC" and comparing the values of the obtained value biological parameters with the above values, it is possible to compare the effect of the drug in numeric values.

As described above, according to this embodiment, it is possible to provide a biological parameter output apparatus that outputs biological parameters representing the effect and the like of administration a drug, for example. Such a biological parameter output apparatus makes it possible to reduce the number of evaluation tests for drugs, thus evaluating the effect of the drugs promptly. Accordingly, drug development processes may be shortened.

Although the values of the biological parameters obtained when administering the drug "ABC" were output in the specific example of this embodiment, the biological parameter output apparatus may also receive the action potential waveform information of a patient suffering from a disease, and output the values of the biological parameters of such a patient. Such processing produces the effect of being able to estimate the disease of the patient and to administer an appropriate drug.

Although the operation of the biological parameter output apparatus was described using three different biological parameters in the specific example of this embodiment for the sake of simplicity of illustration, the number of target biological parameters ordinarily reaches several hundreds, as described above.

Although the reconstructed action potential waveform information was evaluated in a round robin fashion in order to determine the biological parameter in the specific example of this embodiment, it is preferable to employ a search method in which the reconstructed action potential waveform information that is to be retrieved is narrowed down in the early stage using an algorithm such as binary search, for example, when the values of the biological parameters are sorted. It is also preferable to employ an approach such as hybrid tree indexing, the design of experiments method, a genetic algorithm, the steepest descent method or the response surface method.

Although the degree of approximation between the action potential waveform information that was input and the reconstructed action potential waveform information was acquired for the action potential information of APD30, APD60 and APD90 in this embodiment, it should be appreciated that the degree of approximation between the action potential waveform information that was input and the reconstructed action potential waveform information may also be acquired using another information in the action potential information. However, from the viewpoint of the characteristics of the action potential waveform and achieving high-speed processing, it is preferable to use three pieces of the action potential information of APD30, APD60 and APD90.

Furthermore, although the reconstructed action potential waveform information was information acquired by receiving a biological parameter set including at least one piece of biological parameter information as input and using a simulation in this embodiment, the reconstructed action potential waveform information may also be, for example, manually input information. The reconstructed action potential waveform information may also be information acquired by a simulator or experimental measurement apparatus that is not included in the biological parameter output apparatus. The above-described biological parameter output apparatus may also input a time series value representing a behavior of any biological body as actual waveform data, in place of the action potential waveform, and output the biological parameters using any simulation that can reproduce the waveform input as the biological simulation. That is, the original information from which the biological parameters are acquired is not limited to the action potential waveform information. Specifically, in the above-described biological parameter output apparatus, the waveform information storage portion includes at least one piece of biological parameter information, which is a set of biological parameter identifier for identifying a biological parameter and a biological parameter value identified by that biological parameter identifier, and actual waveform data, which is a time series value representing a behavior of any biological body, the waveform information receiving portion receives the information acquired from the biological body, and the biological parameter information acquisition portion acquires at least one piece of biological parameter information based on the information received by the waveform information receiving portion. The actual waveform data, which is a time-series data representing a behavior of an any biological body may be, for example, an eletrocardiographic waveform, time-series data of the blood pressure, time-series data of the cardiac output, time-series data of blood glucose level or oxygen concentration in the blood, and examples of the biological parameters that affects these waveforms include myocardial contraction.

It should be noted that a biological parameter output apparatus for such a case is a biological parameter output apparatus according to the above-described biological parameter output apparatus, wherein the waveform information receiving portion receives any time series value data representing a behavior of a biological body, and the biological parameter information acquisition portion acquires at least one piece of biological parameter information based on the information received by the waveform information receiving portion. Furthermore, the method and the program are a method and program according to the above-described method and program, wherein, in the waveform information receiving step, any time series value data representing a behavior of a biological body is received, and, in the biological parameter information acquisition step, at least one piece of biological parameter information is acquired based on the information received in the waveform information receiving step.

From the foregoing, in this embodiment, the following biological parameter output method may be achieved. That is, the method is a biological parameter output method, including: a waveform information receiving step of receiving input of action potential waveform information, which is information relating to an action potential waveform; a biological parameter information acquisition step of acquiring at least one piece of biological parameter information based on the action potential waveform information; and a biological parameter information output step of outputting the at least one piece of biological parameter information acquired in the biological parameter information acquisition step.

Moreover, the process according to this embodiment may be achieved with software. This software may be distributed by way of a software download or the like. Furthermore, this software may be disseminated by being recorded in a recording medium such as a CD-ROM. Additionally, the software with which the biological parameter output apparatus according to this embodiment is implemented may be the following program. That is, this program is a program for letting a computer perform: a waveform information receiving step of receiving input of action potential waveform information, which is information relating to an action potential waveform; a biological parameter information acquisition step of acquiring at least one piece of biological parameter information based on the action potential waveform information and experiment information; and a biological parameter information output step of outputting the at least one piece of biological parameter information acquired in the biological parameter information acquisition step. This program may be executed by a single or a plurality of computers. In others words, the program may be performed by either centralized processing or distributed processing.

In the above-described embodiment, each process (each function) may be carried out by centralized processing using a single apparatus (system), or alternatively, may be carried out by distributed processing using a plurality of apparatuses.

The invention is not limited to the foregoing embodiment and various modifications are possible, and it should be appreciated that those modifications also fall within the scope of the invention.

INDUSTRIAL APPLICABILITY

As described above, the biological parameter output apparatus according to the present invention has the effect of being able to estimate biological parameters representing the effect and the like of administration of a drug, for example, and is useful, for example, as a simulation apparatus used for drug development.

The invention claimed is:

1. A biological parameter output apparatus, comprising:
a waveform information storage portion that contains at least one piece of waveform information that includes action potential waveform information that has been acquired by receiving a biological parameter set including at least one piece of biological parameter information, which is a set of biological parameter identifier for identifying at least one parameter selected from a current flowing through various channels of a cell, an opening and closing speed of each of the channels, ion affinity, and intracellular and extracellular ion concentrations, and a biological parameter value, which is a value of the biological parameter identified by the biological parameter identifier, inputting the biological parameter set to a model, and performing a simulation using the model, and the biological parameter set;

a waveform information receiving portion that receives input of action potential waveform information, which is information relating to an action potential waveform measured from a biological body before administration of a drug, and action potential waveform information, which is information relating to an action potential waveform measured from the biological body after administration of the drug;

a biological parameter information acquisition portion that identifies and acquires two biological parameter sets before administration of the drug and after administration of the drug, respectively, using a portion or all of the waveform information in the waveform information storage portion and the two different pieces of action potential waveform information received by the waveform information receiving portion; and a biological parameter information output portion that outputs the two biological parameter sets acquired by the biological parameter information acquisition portion.

2. A biological parameter output apparatus, comprising:

a simulation apparatus that receives a biological parameter set including at least one piece of biological parameter information, which is a set of a biological parameter identifier for identifying at least one parameter selected from a current flowing through various channels of a cell, an opening and closing speed of each of the channels, ion affinity, and intracellular and extracellular ion concentration, and a biological parameter value, which is a value of the biological parameter identified by the biological parameter identifier, inputs the biological parameter set to a model, and acquires action potential waveform information using the model, a waveform information receiving portion that receives input of action potential waveform information, which is information relating to an action potential waveform information measured from a biological body before administration of a drug, and action potential waveform information, which is information relating to an action potential waveform measured from the biological body after administration of the drug;

a biological parameter information acquisition portion that identifies and acquires two biological parameter sets before administration of the drug and after administration of the drug, respectively, using a portion or all of waveform information that includes the action potential waveform information acquired by the simulation apparatus and the biological parameter set received by the simulation apparatus, and the two different pieces of action potential waveform information received by the waveform information receiving portion; and a biological parameter information output portion that outputs the two biological parameter sets acquired by the biological parameter information acquisition portion.

3. A biological parameter output method that is realized with a waveform information receiving portion, a biological parameter information acquisition portion, and a biological parameter information output portion, the method comprising:

a waveform information receiving step of receiving, by the waveform information receiving portion, input of action potential waveform information, which is information relating to an action potential waveform measured from a biological body before administration of a drug, and action potential waveform information, which is information relating to an action potential waveform measured from the biological body after administration of the drug;

a biological parameter information acquisition step of identifying, acquiring and storing in a storage medium, by the biological parameter information acquisition portion, two biological parameter sets before administration of the drug and after administration of the drug, respectively, using a portion or all of the waveform information that is stored and the two different pieces of action potential waveform information received in the waveform information receiving step; and a biological parameter information output step of outputting, by the biological parameter information output portion, the biological parameter sets on the storage medium.

4. A biological parameter output method that is realized with a simulation apparatus, a waveform information receiving portion, a biological parameter information acquisition portion, and a biological parameter information output portion, the method comprising:

a simulation step of receiving, by the simulation apparatus, a biological parameter set including at least one piece of biological parameter information, which is a set of biological parameter identifier for identifying at least one parameter selected from a current flowing through various channels of a cell, an opening and closing speed of each of the channels, ion affinity, and intracellular and extracellular ion concentrations, and a biological parameter value, which is a value of the biological parameter identified by the biological parameter identifier, inputting the biological parameter set to a model, and acquiring action potential waveform information using the model, a waveform information receiving step of receiving, by the waveform information receiving portion, input of action potential waveform information, which is information relating to an action potential waveform measured from a biological body before administration of a drug, and action potential waveform information, which is information relating to an action potential waveform measured from the biological body after administration of the drug;

a biological parameter information acquisition step of identifying and acquiring, by the biological parameter information acquisition portion, two biological parameter sets before administration of the drug and after administration of the drug, respectively, using a portion or all of waveform information that includes the action potential waveform information acquired in the simulation step and the biological parameter set received in the simulation step, and the two different pieces of action potential waveform information received in the waveform information receiving step; and a biological parameter information output step of outputting, by the biological parameter information output portion, the two biological parameter sets acquired in the biological parameter information acquisition step.

5. A program product stored in a computer readable medium, that permits a computer to implement the following steps:

a waveform information receiving step of receiving input of action potential waveform information, which is information relating to an action potential waveform measured from a biological body before administration of a drug, and action potential waveform information, which is information relating to an action potential waveform measured from the biological body after administration of the drug;

a biological parameter information acquisition step of reading, from a storage medium that contains at least one piece of waveform information that includes action potential waveform information that has been acquired by receiving a biological parameter set including at least one piece of biological parameter information, which is a set of a biological parameter identifier for identifying at least one parameter selected from a current flowing through various channels of a cell, an opening and closing speed of each of the channels, ion affinity, and intracellular and extracellular ion concentrations, and a biological parameter value, which is a value of the biological parameter identified by the biological parameter identifier, inputting the biological parameter set to a model, and performing a simulation using the model, and the biological parameter set, two biological parameter sets before administration of the drug and after administration of the drug, respectively, using a portion or all of the waveform information and the two different pieces of action potential waveform information received in the waveform information receiving step, identifying, acquiring and storing in a storage medium the two biological parameter sets; and a biological parameter information output step of outputting the two biological parameter sets acquired by the biological parameter information acquisition step.

6. A program product stored in a computer readable medium, that permits a computer to implement the following steps:

a simulation step of receiving a biological parameter set including at least one piece of biological parameter information, which is a set of a biological parameter identifier for identifying at least one parameter selected from a current flowing through various channels of a cell, an opening and closing speed of each of the channels, ion affinity, and intracellular and extracellular ion concentrations, and a biological parameter value, which is a value of the biological parameter identified by the biological parameter identifier, inputting the biological parameter set to a model, and acquiring action potential waveform information using the model, a waveform information receiving step of receiving input of action potential waveform information, which is information relating to an action potential waveform measured from a biological body before administration of a drug, and action potential waveform information, which is information relating to an action potential waveform measured from the biological body after administration of the drug;

a biological parameter information acquisition step of identifying and acquiring two biological parameter sets before administration of the drug and after administration of the drug, respectively, using a portion or all of waveform information that includes the action potential waveform information acquired in the simulation step and the biological parameter set received in the simulation step, and the two different pieces of action potential waveform information received in the waveform information receiving step; and a biological parameter information output step of outputting the two biological parameter sets acquired in the biological parameter information acquisition step.

* * * * *